July 14, 1936.   A. S. RINGEL   2,047,290
MOTION PICTURE SCREEN
Filed March 2, 1933
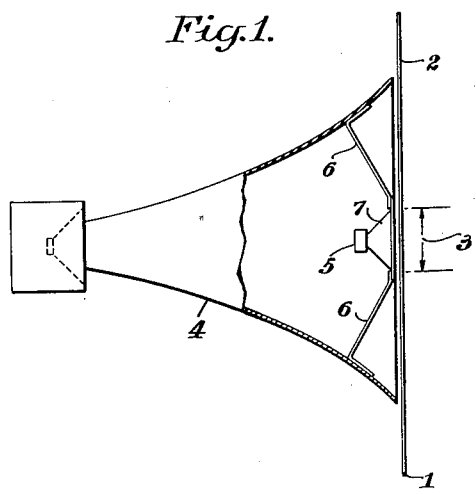
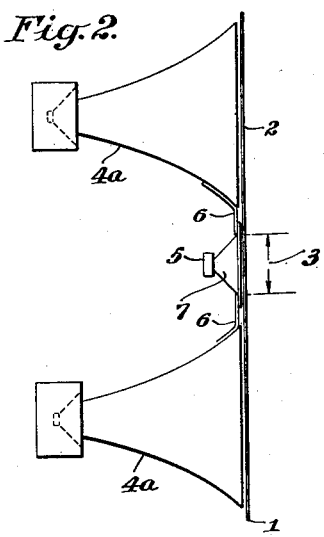
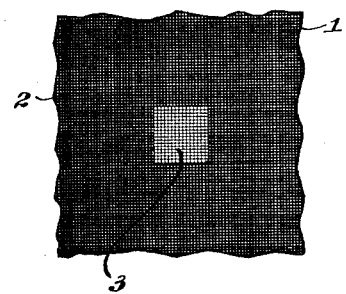
INVENTOR:
Abraham S. Ringel,
BY J. R. Goldsborough
HIS ATTORNEY.

Patented July 14, 1936

2,047,290

UNITED STATES PATENT OFFICE 2,047,290

MOTION PICTURE SCREEN

Abraham S. Ringel, Merchantville, N. J., assignor to Radio Corporation of America, New York, N. Y., a corporation of Delaware Application March 2, 1933, Serial No. 659,273

14 Claims. (Cl. 88—24)

This invention relates to acousto-cinematographic apparatus, and, more particularly, to a motion picture screen with which are associated two or more loud speakers for reproducing sound to accompany the action portrayed on the screen.

In apparatus of this type used in motion picture theatres, the loud speakers are generally located behind the screen, which is made of a porous material to permit the reproduced sound to pass therethrough to the audience. There are limitations, however, on the degree of porosity of the screen. As the porosity of the screen is increased, its power to reflect light is correspondingly decreased. On the other hand, as the porosity of the screen is decreased, its ability to transmit sound becomes lessened to a corresponding degree, and screens which have been adopted as standard have been, of necessity, chosen with greater regard to their light reflecting power than to their sound transmission characteristics. As a result, the so-called "sound screens" at present generally in use are subject to the disadvantage that the sound passing therethrough is attenuated, especially at the higher frequencies, and the attenuation becomes much greater as frequencies of 8,000 and more cycles are reached.

Where, as in the case of reproducing equipment heretofore generally employed in commercial installations, the reproducing equipment operated efficiently only below about 6,000 cycles for example, a screen of the type referred to above was fairly satisfactory. However, with the introduction of reproducing equipment which operates efficiently up to around 15,000 cycles, and which has recently gone into extensive use because of its relatively greater fidelity, it is apparent that such screens impose a definite limitation upon the efficiency of the new reproducing systems, and they are, therefore, unsatisfactory for use with these new reproducers.

It is the primary object of my invention to provide an improved motion picture screen which will not be subject to the disadvantages heretofore pointed out in connection with existing screens and which will not appreciably cut down the efficiency of high fidelity reproducing systems.

Another object of my invention is to provide an improved sound screen which, while retaining the desired light reflecting power, will, nevertheless, also transmit sound over a greater range of frequencies than heretofore without appreciably attenuating the higher frequencies over this range.

A further object of my invention is to provide an improved sound screen which will have different sound transmission characteristics throughout its surface.

Still another object of my invention is to provide an improved sound screen which is so associated with a number of reproducing devices of different characteristics that each of said devices will direct the sound reproduced thereby over a selected portion of the screen, each portion being chosen with due regard to the characteristics of the particular reproducing device with which it is associated.

It is a further object of my invention to provide acousto-cinematographic apparatus of the type referred to which is simple in construction, which readily lends itself to the requirements of economical commercial manufacture and installation, and which is highly efficient in use.

In accordance with my invention, I provide a sound screen which may be made of more or less standard, porous, opaque material except for a small area, preferably in the center, which is made of a more porous and less opaque material. Behind the standard material, I place one or more loud speakers designed to particularly reproduce sound of relatively lower frequencies with high fidelity, while a loud speaker designed to particularly reproduce sound of high frequencies with great fidelity is disposed behind the more porous area of the screen. Thus the sounds of lower frequencies are reproduced with no less efficiency than before, while the sounds of the higher frequencies are reproduced with far greater fidelity than heretofore by reason of the fact that the small, porous area associated with the high frequency speaker transmits high frequency sounds with only negligible attenuation.

The novel features of my invention are set forth with particularity in the appended claims. The invention itself, however, both as to its organization and method of operation, together with additional objects and advantages thereof, will best be understood from the following description of several specific embodiments thereof, when read in connection with the accompanying drawing, in which Figure 1 is a side elevation of one form of my invention, Figure 2 is a side elevation of a modified form thereof, and Figure 3 is an enlarged, fragmentary, detail view of my improved sound screen.

Referring to the drawing, wherein similar reference characters indicate corresponding parts throughout, I have shown a light reflecting sound screen 1 consisting of a relatively finely-woven section 2 and a relatively coarsely woven section 3. The screen 1 may be made of any suitable material, such as fabric, metal tape or wire, etc., and the portions 2 and 3 may both be made of the same material and woven in one unit, if desired, or they may be made of different materials and united into a single unit, it being essential only that the portion 2 shall have relatively fine interstices, so that its light reflecting power will not be appreciably reduced, while the portion 3 shall have relatively large interstices, so that it will not appreciably attenuate the sound passed therethrough.

Behind the screen 1, I place one or more loud speakers 4, 4a designed to reproduce sound of lower frequencies most efficiently, and a loud speaker 5 designed to reproduce with high fidelity sound of high frequencies, for example, from 10,000 to 15,000 cycles. In the modification of Figure 1, I have shown but a single loud speaker 4 which is so disposed behind the screen 1 as to project the sound reproduced thereby over substantially the entire area of and through the screen 1. In place of a single loud speaker so disposed, it is, of course, possible to provide a plurality of low frequency loud speakers 4a, each covering only a portion of the section 2, as in Figure 2. The loud speaker 5, on the other hand, is placed directly behind the more porous area 3 of the screen 1 and directs the sound which it reproduces through only the section 3 since it is, preferably, made co-extensive therewith, being held in place in any suitable manner, as by connection to the speaker 4 or speakers 4a, as the case may be, by means of stays 6 or the like.

The section 3 of my improved screen is preferably from about three inches to eight inches square, and is preferably formed of very thin silk. Although this will reduce the light transmitting power of the screen at the center, the area of the section 3 is so small in comparison to the entire screen area, that it will be hardly noticeable. However, in order to compensate for the slight loss in reflected light, the inside of the horn portion 7 of the speaker 5 may be painted white or otherwise treated to become highly light reflecting. Thus, only a very slight amount of light, at the most, will be lost.

From the foregoing, it will be apparent that I have provided a highly efficient sound reproducing system in connection with a motion picture screen for simultaneously reproducing action and accompanying sound. It is to be understood, however, that, although I have shown and described several embodiments of my invention, it is not necessarily limited to those shown and described. For example, in place of a single, central sound-porous section 3, the screen 1 may be provided with a number of such sections at suitably located points, each having a high frequency speaker associated therewith, and, in fact, the speaker 5 may be placed to one side of or above, but adjacent to, the screen 1, if desired. Also, in place of a woven screen, it may be made of solid sheet material, such as sheet metal, wood veneer, bakelite, etc., the sheet being punched with a number of small, relatively distantly spaced holes in the section 2, and with a number of larger holes, or the same size holes placed more closely to each other, in the section 3.

Moreover, if desired, the central section 3 may be made to have substantially the same light reflecting power as the peripheral section 2 by coloring the section 3 a lighter color than the section 2, so that while the porosity of the two sections varies inversely as the frequency of sound transmitted, the lightness of the color thereof varies directly as the value of the frequency transmitted.

Other modifications will also readily suggest themselves to those skilled in the art.

My invention, therefore, is not to be restricted except insofar as is necessitated by the prior art and by the spirit of the appended claims.

I claim as my invention:

1. A motion picture screen comprising a plurality of continuous, sound porous sections all lying in the same plane, the interstices of one section being finer than the interstices of another section, and the latter section having a lighter color than the former section.

2. A motion picture screen comprising a plurality of sound porous sections, the interstices of one section being finer than the interstices of another section, both of said sections being adapted to transmit sound, the latter especially high frequencies and the former especially low frequencies, and said latter section having a lighter color than said former section, the porosity of each of said sections varying inversely as the frequencies transmitted thereby and the lightness of their respective colors varying directly as the frequencies transmitted thereby.

3. In combination, a motion picture screen comprising a plurality of sections, each section having different sound transmission characteristics and light reflecting power, and means associated with a section having a relatively lesser light reflecting power for compensating for said relatively lesser power.

4. In combination, a motion picture screen comprising a plurality of sound porous sections, each section having a different light reflecting power, and a member located behind a section having relatively lesser light reflecting power, said member being provided with a highly light reflecting surface facing said section, whereby to compensate for the light passing through and otherwise lost from said last-named section.

5. In combination, a motion picture screen comprising a plurality of sound porous sections, each having different sound transmission characteristics, means for projecting sounds of preselected frequencies through one of said sections and means for projecting sounds of different preselected frequencies through another of said sections.

6. In combination, a motion picture screen comprising a plurality of sound porous sections, the interstices of one section being finer than the interstices of another section, means associated with one of said sections for reproducing sounds of preselected frequencies, and means associated with said other section for reproducing sounds of different preselected frequencies, both said sound reproducing means being arranged to project their sounds through their respective screen sections.

7. In combination, a motion picture screen comprising a plurality of sound porous sections, the interstices of one section being finer than the interstices of another section, means associated with one of said sections for reproducing sounds of relatively lower frequencies, and means associated with said other section for reproducing sounds of relatively higher frequencies, both said sound reproducing means being arranged to project their sounds through their respective screen sections.

8. In combination, a motion picture screen comprising a plurality of sound porous sections, the interstices of one section being finer than the interstices of another section, means associated with the section having relatively finer interstices for reproducing sounds of relatively lower frequencies, and means associated with said other section for reproducing sounds of relatively higher frequencies, both said sound reproducing means being arranged to project their sounds through their respective screen sections.

9. In combination, a motion picture screen comprising a pair of sound porous sections one within the other, the interstices of the outer section being finer than the interstices of the inner section, means associated with said outer section for reproducing sounds of relatively lower frequencies, and means associated with said inner section for reproducing sounds of relatively higher frequencies, both said sound reproducing means being arranged to project their sounds through their respective screen sections.

10. In combination, a motion picture screen comprising a pair of sound porous sections one within the other, the interstices of the outer section being finer than the interstices of the inner section, means associated with said outer section for reproducing sounds of relatively lower frequencies, and means associated with said inner section for reproducing sounds of relatively higher frequencies, both said sound reproducing means being located behind said screen and facing the rear surface thereof whereby the sounds reproduced thereby are projected through their respective screen sections.

11. In combination, a motion picture screen comprising a pair of sound porous sections one within the other, the interstices of the outer section being finer than the interstices of the inner section, means associated with said outer section for reproducing sounds of relatively lower frequencies and means associated with said inner section for reproducing sounds of relatively higher frequencies, both said sound reproducing means being located behind said screen and facing the rear surface thereof whereby the sounds reproduced thereby are projected through their respective screen sections, and said means for reproducing sounds of relatively higher frequencies having a highly light reflecting surface for cooperation with said inner screen section.

12. In combination, a motion picture screen comprising a peripheral section and a substantially central section, said sections being united to form a continuous light reflecting surface and both being sound porous, said peripheral section having relatively fine interstices and a relatively higher light reflecting surface and said central section having relatively coarse interstices and a relatively lower light reflecting surface, means associated with said peripheral section for reproducing sounds of relatively lower frequencies, and means associated with said central section for reproducing sounds of relatively higher frequencies, both said sound reproducing means being located behind said screen and facing the rear thereof whereby the sounds reproduced thereby are projected through their respective screen sections, and said means for reproducing sounds of relatively higher frequencies having a light reflecting surface for cooperation with said central screen section to compensate for its relatively lower light reflecting power.

13. In combination, a motion picture screen comprising a peripheral section and a substantially central section of small area compared to the area of said peripheral section, said sections being united to form a continuous light reflecting surface and both being sound porous, said peripheral section having relatively fine interstices and a relatively higher light reflecting surface and said central section having relatively coarse interstices and a relatively lower light reflecting surface, means associated with said peripheral section for reproducing sounds of relatively lower frequencies, and means associated with said central section and substantially coextensive therewith for reproducing sounds of relatively higher frequencies, both said sound reproducing means being located behind said screen and facing the rear thereof whereby the sounds reproduced thereby are projected through their respective screen sections, and said means for reproducing sounds of relatively higher frequencies having a light reflecting surface for cooperation with said central screen section to compensate for its relatively lower light reflecting power.

14. A motion picture screen comprising a plurality of continuous, sound-porous and light-reflective sections all lying in the same plane, each section having substantially uniform sound-transmitting characteristics, and all of the interstices of one section being larger than those of another section, the last-mentioned section entirely surrounding the first-mentioned section.

ABRAHAM S. RINGEL.